United States Patent [19]
Archambeault et al.

[11] Patent Number: 6,102,136
[45] Date of Patent: *Aug. 15, 2000

[54] BORE LOCATION SYSTEM HAVING MAPPING CAPABILITY

[76] Inventors: John T. Archambeault, 1500 Canton Ave., Joliet, Ill. 60435; David J. Gasmovic, 7 Glenbriar Ct., Simpsonville, S.C. 29681; Morio Mizuno, 11 Nishiyoshihara, Nakahon-Machi, Iwakura-Shi, Aichi-Ken, Japan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/975,801

[22] Filed: Nov. 21, 1997

Related U.S. Application Data

[63] Continuation of application No. 08/583,303, Jan. 16, 1996, Pat. No. 5,711,381.

[51] Int. Cl.[7] ........................................... G01V 1/00
[52] U.S. Cl. ..................... 175/45; 340/853.3; 340/853.4
[58] Field of Search ................... 175/45, 61, 62; 340/853.3, 853.4, 853.6

[56] References Cited

U.S. PATENT DOCUMENTS

| | | |
|---|---|---|
| 3,617,865 | 11/1971 | Hakata . |
| 3,753,296 | 8/1973 | Van Steenwyk . |
| 3,906,504 | 9/1975 | Guster et al. . |
| 4,403,664 | 9/1983 | Sullinger . |
| 4,597,067 | 6/1986 | Bockhorst et al. . |
| 4,700,142 | 10/1987 | Kuckes . |
| 4,714,118 | 12/1987 | Baker et al. . |
| 4,794,534 | 12/1988 | Millheim . |
| 4,806,869 | 2/1989 | Chau et al. . |
| 4,821,815 | 4/1989 | Baker et al. . |
| 4,833,658 | 5/1989 | Staron . |
| 4,875,014 | 10/1989 | Roberts et al. . |
| 4,881,083 | 11/1989 | Chau et al. . |
| 4,884,847 | 12/1989 | Bessinger et al. . |
| 4,930,595 | 6/1990 | Hayward et al. . |
| 4,993,503 | 2/1991 | Fischer et al. . |
| 5,133,417 | 7/1992 | Rider . |
| 5,155,442 | 10/1992 | Mercer . |
| 5,193,628 | 3/1993 | Hill, III et al. . |
| 5,231,355 | 7/1993 | Rider et al. . |
| 5,264,795 | 11/1993 | Rider . |
| 5,296,807 | 3/1994 | Kousek et al. . |
| 5,320,180 | 6/1994 | Ruley et al. . |
| 5,361,854 | 11/1994 | Tull et al. . |
| 5,363,926 | 11/1994 | Mizuno . |
| 5,439,064 | 8/1995 | Patton . |
| 5,467,083 | 11/1995 | McDonald et al. . |
| 5,469,155 | 11/1995 | Archambeault et al. . |
| 5,553,677 | 9/1996 | Hinz . |
| 5,585,726 | 12/1996 | Chau . |
| 5,640,092 | 6/1997 | Motazed et al. . |
| 5,711,381 | 1/1998 | Archambeault et al. .................. 175/45 |

OTHER PUBLICATIONS

Advertisement—"DigiTrak" Drill Head Monitor Straightline Manufacturing, Inc.

(List continued on next page.)

*Primary Examiner*—William Neuder
*Attorney, Agent, or Firm*—Nelson Mullins Riley & Scarborough, L.L.P.

[57] ABSTRACT

A system for mapping horizontal bores below a ground surface is provided. A transmitting source radiates a location signal from a bore. The bore may be a newly dug bore or a bore containing an existing utility. A receiver device receives a location signal and indicates, responsively to the location signal, the lateral position of the horizontal bore with respect to the receiver device. A measurement device measures the depth of the bore with respect to the ground surface at selected locations along the bore. A monitor device receives the depth data from the measurement device, compiles the depth data associated with the selected locations with respect to at least one reference position, and outputs the compiled depth data so that the depth of the bore at the selected locations may be collectively identified.

36 Claims, 9 Drawing Sheets

OTHER PUBLICATIONS

Advertisement—Radiodetection RD400SL Information, Radiodetection Corporation (Ridgewood, NJ) c/o Telco Sales, Inc., Elkhorn Wisconsin.

Advertising Brochure—"SpotDtek" Pipe and Cable Locator (No. 776–16/292) McLaughlin Boring Systems, Greenville, South Carolina.

Advertising Brochure—"A New Generation of Machines for the '90's" (No. 502/991), McLaughlin Boring Systems, Greenville, South Carolina.

Advertising Brochure—"Micro–Computerized Pipe Locator Maintenance Manual", Takachiho Sangyo Co., Ltd., Minato–Ku, Tokyo.

Advertising Brochure—"Micro–Computerized Pipe Locator Fundamental Principles & Features", Takachiho Sangyo Co., Ltd., Minato, Tokyo.

Advertising Brochure—"Push 'N Mole Pipe Pusher McL–1200", (No. 776–15/292), McLaughlin Boring Systems, Greenville, South Carolina.

Advertising Brochure—"SpotDtek II Pipe & Cable Locator", (No. 776–16/595), McLaughlin Boring Systems, Greenville, South Carolina.

Advertisement—"Surfer for Windows", Golden Software, Inc., Golden, Colorado.

Booklet—Instructions for Manually Ploting a Bore, pp. 18–21, using Ditch Witch.

Advertising Brochure—"SpotDtek II Bore Location System", (No. 495–18/495), McLaughlin Boring Systems, Greenville, South Carolina.

Booklet—"The Steerable System", Smith International, Houston, Texas.

Advertisement Brochure—"Maxibor Software", Reflex Instrument, AB, Vallentuna, Sweden.

Booklet—"Reflex Maxibor Borehole Survey System", Reflex Instrument, AB, Vallentuna, Sweden.

Brochure—No–Dig International, pp. 5–8, Dec. 1995.

Brochure—"Pipe Hawk", Emrad Limited, Guildford, Gu2 5YH.

Brochure—"ABEM GEOMAC III, Rugged, handheld MS–DOS field computer", ABEM AB Bromma, Sweden, 1991.

Brochure—Reflex Maxibor the Vital Swedish Link Between England and France, Reflex Instrument AB, Vallentuna, Sweden.

Advertisement—"All Holes Deviate", Reflex Instrument AB, Vallentuna, Sweden.

DigiTrack Training Manual, Digital Control Incorporated Oct. 1995 Edition.

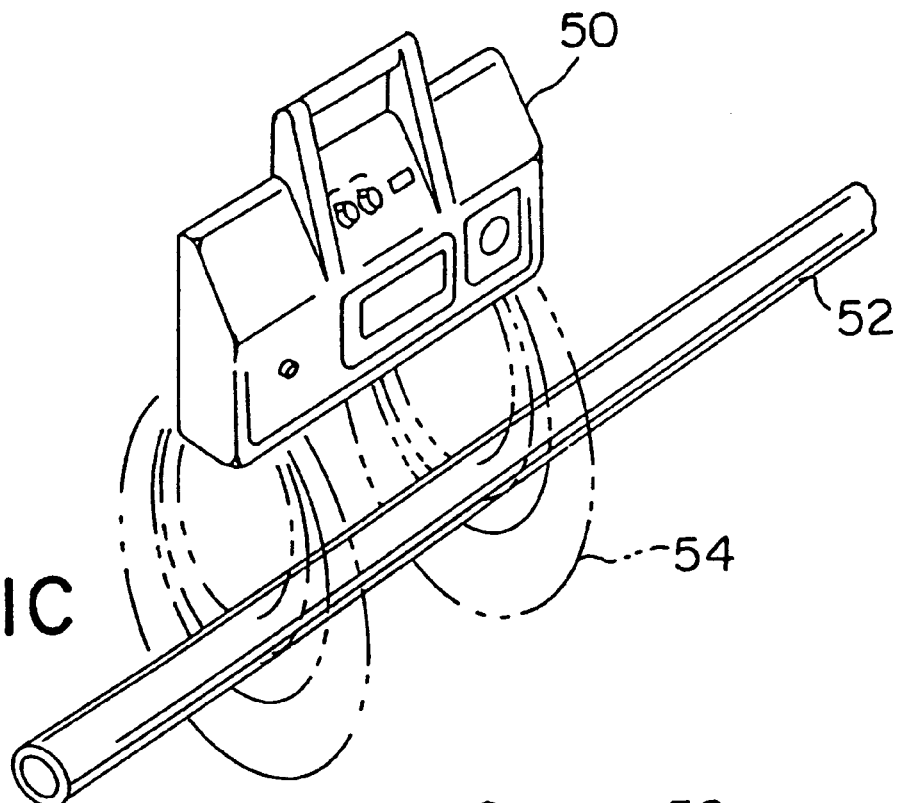
FIG. IIC
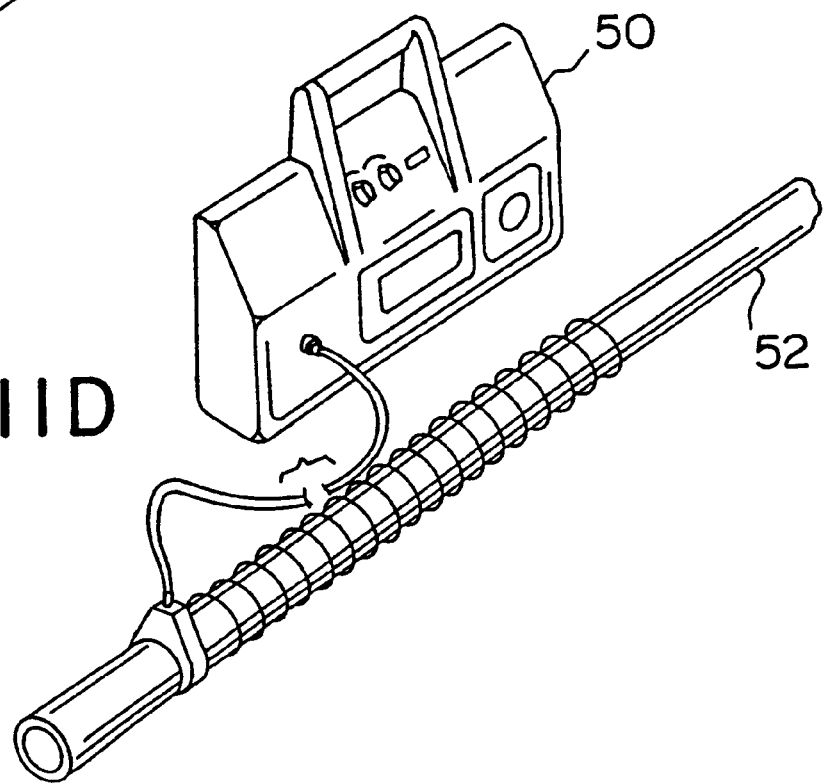
FIG. IID

BORE LOCATION SYSTEM HAVING MAPPING CAPABILITY

This is a continuation of application Ser. No. 08/583,303, filed Jan. 16, 1996, now U.S. Pat. No. 5,711,381.

BACKGROUND OF THE INVENTION

The present invention relates generally to underground bore location systems and, more particularly, to a novel underground bore location system and method for detecting and compiling bore location data so that a bore map may be generated.

Those of ordinary skill in the art should recognize that the term "bore" refers to the excavation of a hole, typically for utilities, through the ground and to the excavated hole itself. The present invention relates to systems and methods for locating such bores, but also to such systems and methods for locating existing buried utilities, whether such existing utilities were initially installed by boring or trenching techniques. Accordingly, unless otherwise indicated, the term "bore" as used herein refers to new bores and to existing buried utilities or similar lines.

Boring location systems are utilized in a variety of circumstances. For example, in horizontal boring systems as are typically used for installing utilities, it is desirable to maintain a directional boring head in a desired boring path and to avoid known obstacles such as existing utilities. Accordingly, systems are known to trace existing utilities from an aboveground position. Similarly, it is often desirable to map existing utilities.

While such known systems are capable of indicating the position and depth of a bore at a specific location, they are generally unable to produce a corresponding plot during a new bore or as an existing bore is located. Such plots may, for example, track the position of a new bore with respect to known underground obstacles. Thus, an operator may, by monitoring the plot, control the directional boring head to avoid the obstacles. Such mapping of a new or existing bore has in the past been accomplished manually. For example, an operator with an aboveground monitoring device that detects a signal radiated from a probe proximate a directional boring head may walk on the ground surface tracing the progress of the probe during the bore. The operator may manually relay information to a second operator by voice or other communication means so that a plot of the bore may be generated.

Manual plotting methods are slow, inefficient, and prone to error. Thus, it is desirable for a bore location system to automatically compile data relating to the depth of a bore so that a bore plot may be automatically generated.

SUMMARY OF THE INVENTION

The present invention recognizes and addresses the disadvantages of the prior art. Accordingly, it is an object of the present invention to provide an improved bore location system.

It is a further object of the present invention to provide a system and method for mapping a horizontal bore which determines the position of the bore through detection of electromagnetic signals radiated from the bore.

It is a still further object of the present invention to provide a system and method for producing bore plot information in real time as a bore is located.

These and other objects are achieved by providing a system for mapping horizontal bores below a ground surface. The system includes a transmitting source configured to radiate a location signal from the bore. A receiver device is configured to receive the location signal and to indicate, responsively to the location signal, the lateral position of the horizontal bore with respect to the receiver. A measurement device is configured to measure the depth of the bore with respect to the ground surface at selected locations along the bore, and a monitor device is configured to receive depth data from the measurement device. The monitor device is also configured to compile the depth data associated with the selected locations with respect to at least one reference position and to output the compiled depth data so that the depth of the bore at the selected locations may be collectively identified.

The measurement device may be configured to measure the underground depth of the bore by a variety of methods. For example, depth measurements may be taken by determination of a field gradient of a received location signal or by detection of a radiated magnetic field indicating deviation from a predetermined desired path. Furthermore, the measurement device may be embodied by the receiver device. Accordingly, in one presently preferred embodiment, the receiver device and measurement device comprise a single portable assembly which the operator uses to locate the lateral position of the bore via the location signal, taking a depth measurement in a known fashion at the selected location. Thus, a visual display device at the receiver may display information indicative of both the bore's lateral position and depth.

Similarly, the transmitting source may generate the location signal in a number of ways. For example, the source may be a probe fed through an existing bore or housed within a boring head cutting a new bore. Alternatively, the source may be an aboveground unit that directly creates or indirectly induces an electric current along an existing utility which, in turn, generates a radiating magnetic field which is received by the receiver device. Furthermore, the source may be the utility itself where the utility conducts an electric current that generates its own magnetic field.

A method according to the present invention for mapping horizontal bores below a ground surface includes the steps of receiving a location signal radiated from the bore, determining depth of the bore responsively to the received location signal, compiling data corresponding to the depth of the bore at selected locations along the bore, and displaying the compiled data so that the depth of the bore at the selected locations may be collectively identified.

BRIEF DESCRIPTION OF THE DRAWINGS

A full and enabling disclosure of the present invention, including the best mode thereof, to one of ordinary skill in the art, is set forth more particularly in the remainder of the specification including reference to the accompanying figures in which:

FIG. 11C is a perspective view of a transmitting source in accordance with an embodiment of the present invention;

FIG. 11D is a perspective view of a transmitting source in accordance with an embodiment of the present invention;

Figure 1:
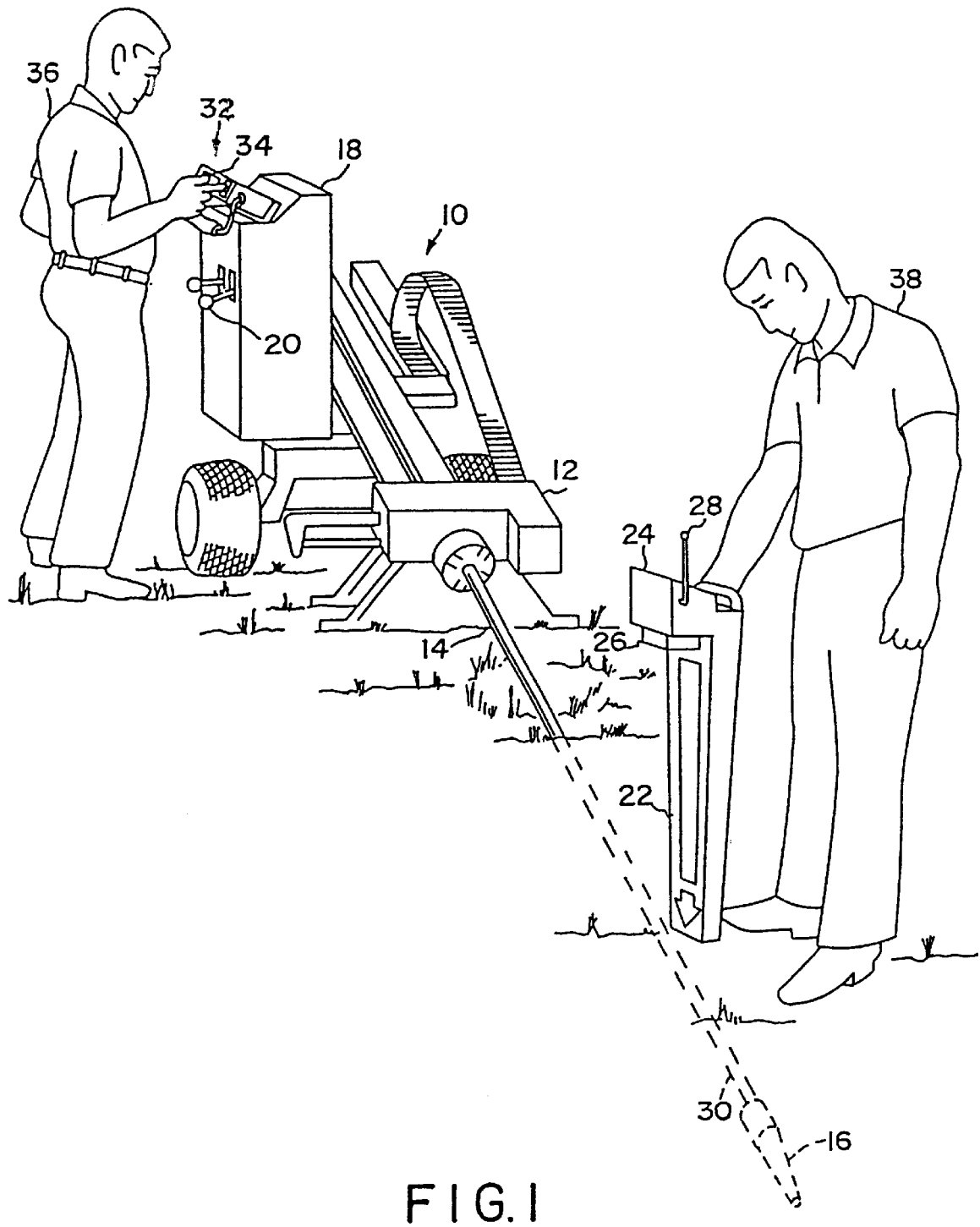
FIG. 1 is a perspective view of a wireless remote boring system in accordance with an embodiment of the present invention.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without parting from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalence.

Referring to FIG. 1, a directional boring device 10 in accordance with an embodiment of the present invention is illustrated. A boring machine 12 is located in an initial position and includes a boring rod 14 and a directional boring head 16. The boring machine includes a control panel 18 with actuators 20 for controlling the operations of the boring device. In accordance with the present invention, means for wireless receipt of location signals from a transmitting source includes a receiver device 22. Receiver 22 includes a display 24 and the means for wireless transmission from the receiver device of information received from the transmitting source to a remote monitor device. As embodied herein, the means for wireless transmission includes a wireless transmitter 26 with an antenna 28.

A signal generating probe 30 is located generally adjacent boring head 16 for emitting location signals containing information about the boring device as will be discussed in more detail below. The improved guidance system further includes a remote monitoring device 32 located generally adjacent to boring machine 12 for receiving the transmitted information from transmitter 26 via wireless transmission. Remote monitor 32 includes a display 34 so that the operator 36 of the boring device can see and/or hear the information transmitted from transmitter 26.

Accordingly, a workman 38 at a distant location from the boring machine 12 utilizes receiver 22 to receive a location signal from signal generating probe 30, which signal contains information with respect to the boring head 16. Such information may be, for example, its location, its depth below the ground, its pitch, its angular position or roll, its temperature, and/or the remaining battery life of the probe. This information is received by receiver 22 as will be described in more detail below and is processed on display 24 at this location.

Substantially simultaneously and in real time, transmitter 26 transmits signals carrying the information that is displayed on display 24 to the monitor 32 via wireless transmission. Remote monitor 32 processes these signals and displays them on display 34. Both data and image signals may be transmitted between the wireless transmitter and remote monitor 32. Thus, operator 36 at the boring device is able to obtain real time information with respect to the boring head just as the workman 38 is able to obtain this information at the location of the boring head. The particular mechanisms for accomplishing this with respect to a preferred embodiment will be described in more detail below.

Figure 11A:
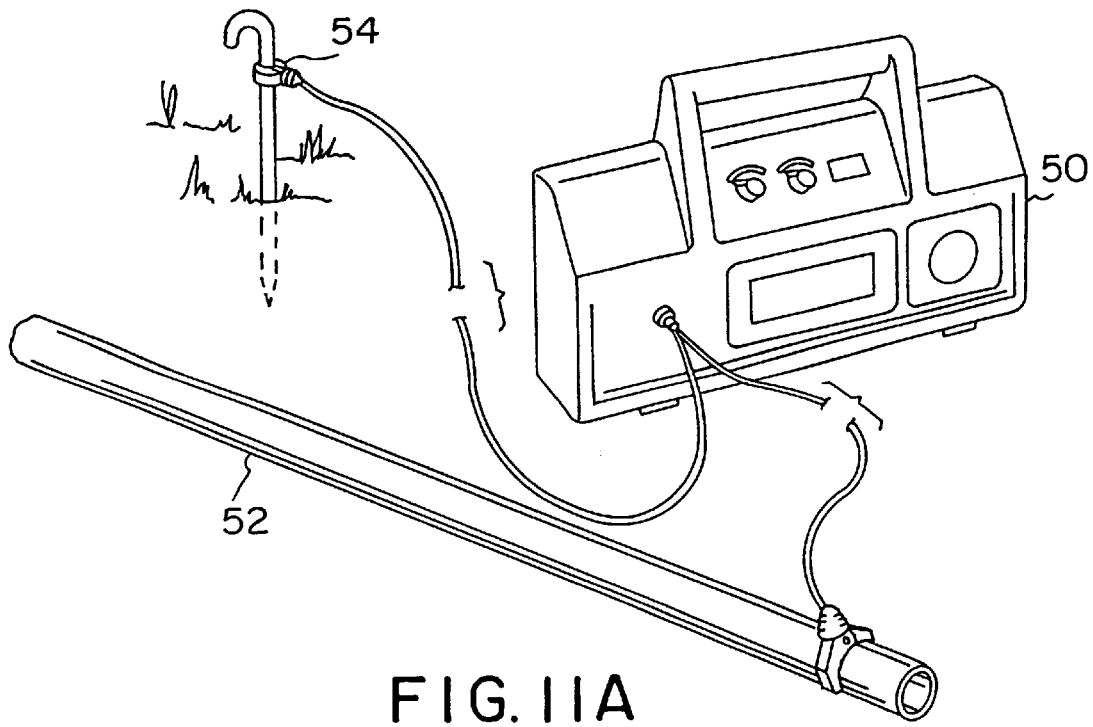
FIG. 11A is a perspective view of a transmitting source in accordance with an embodiment of the present invention.

The present invention may also be utilized with systems for locating existing utilities. For example, referring to FIG. 11A, transmitting source 50 radiates a location signal from utility 52 located within the bore. Cables from transmitting source 50 are clipped directly to buried utility 52 and to ground at 54. AC current will carry along the length of the conductor and will return through a grounded stake to transmitter 50, providing a signal loop. Current strength displayed on both transmitter 50 and receiver 22 is at its maximum as receiver 22 moves directly over and traces the utility. Receiver 22 may indicate the maximum current by audible or visual means, thereby indicating the lateral position of the horizontal bore with respect to the receiver device. Thus, an operator carrying a portable receiver device can move to his left or right until the receiver device is approximately directly above the utility.

Faults can be detected by current fluctuation. A microprocessor within receiver 22 rejects the depth reading when receiver 22 strays over other utilities in the area by indicating "DETECTING ERROR" on the visual display. Current strength is adjustable to avoid bleeding onto other utilities in congested areas, and to "power-up" for a longer locate in areas where no other utilities are present. One transmitting source configured to operate in accordance with the present invention as described above and below is the SpotDTek® marketed by McLaughlin Manufacturing Company, Inc. of Greenville, S.C.

Figure 11B:
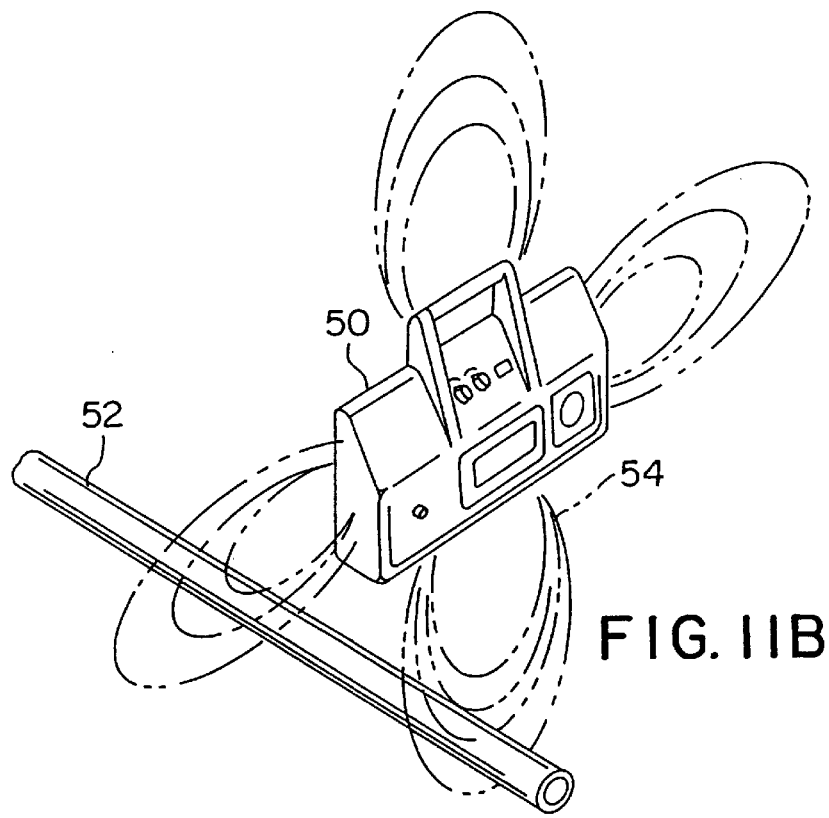
FIG. 11B is a perspective view of a transmitting source in accordance with an embodiment of the present invention.

Transmitter 50 may also be configured to indirectly generate the location signal when a direct connection to the utility is impractical. For example, referring to FIG. 11B, transmitter 50 is placed on the ground surface in an upright position above the utility 52. Transmitter 50 emits a varying magnetic field 54 to generate a current along utility 52 which, in turn, induces a magnetic field along the length of utility 52. Accordingly, receiver 22 may detect the location signal. Using the McLaughlin SpotDTek®, this indirect mode is effective for utilities buried at depths of 6.5 feet or less and produces a location signal detectable up to 200 feet. As in the direct connection mode, "DETECTING ERROR" will be displayed if receiver 22 picks up other utilities in the area. The current induction strength is adjustable in this mode to tune out other utilities in congested areas. Current readout on the digital display will also detect faults as receiver 22 is moved along the surface.

Referring now to FIG. 11C, for depths between 6.5 and 16 feet transmitter 50 is placed over utility 52. A strong signal 54 is generated by twin coils, and high AC power provides an effective detection range of over 1,000 feet. As in the short span indirect mode, current strength can be fine-tuned so that other utilities and faults may be readily detected.

Referring to FIG. 11D, a coil clamp can be used on metallic lines or to induce a signal through PVC lines. The coil clamp does not have to close around the conductor. It need only be placed on and parallel to the utility 52. The SpotDTek® external coil mode has a detection range of over 1,000 feet.

Figure 12:
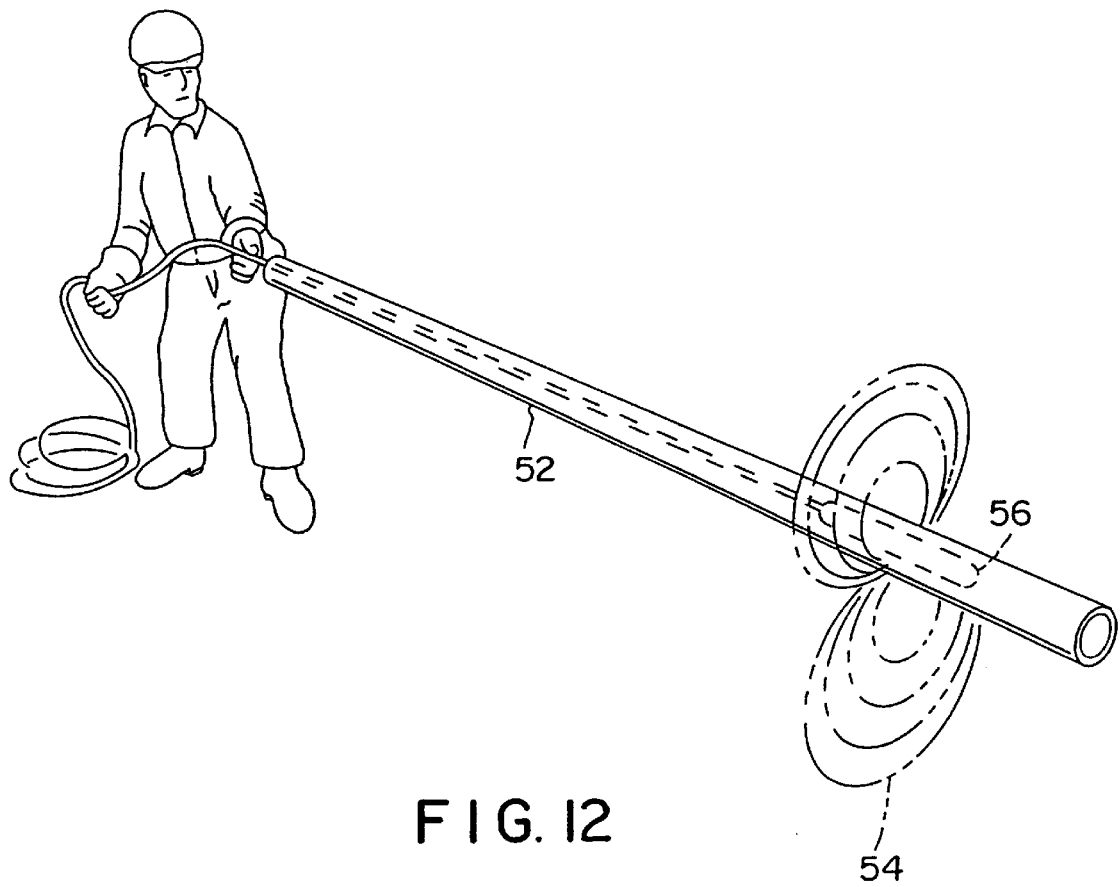
FIG. 12 is a schematic illustration of a transmitting source in accordance with an embodiment of the present invention.

The above-described methods for detecting an existing utility involve radiating a location signal from a metallic utility. Referring to FIG. 12, a transmitting source for use with nonmetallic pipe includes a battery operated transmitter probe 56 inserted in PVC or other nonmetallic pipe having a 1" or larger internal diameter. Probe 56 emits a magnetic location signal 54 that is received by a receiver 22 which traces the progress of probe 56 as it is routed through the utility 52.

Furthermore, the transmitting source may be simply the utility itself. For example, power and telecommunication lines emit their own electromagnetic radiation which may be used as location signals. Thus, receiver 22 may trace these utilities while detecting the self-emitted location signal. The SpotDTek® device may be programmed, for example, for three passive frequencies, 50–60 Hz for live power and 13–17 KHz and 18–22 KHz for two radio frequencies. Thus, such utilities may be located without the need of signal inducement as long as current is flowing on the lines.

It should also be understood that the receiver 22 may be stationary. For example, the present invention could be utilized in bore homing systems like those disclosed in Chau et al., U.S. Pat. No. 4,881,083 and Bridges et al., U.S. Pat. No. 4,646,277.

Furthermore, as will be apparent to those of ordinary skill in the art, a variety of suitable apparatus and methods may be employed to radiate a location signal from a bore, to receive the location signal, to determine the depth of the bore responsively to the received location signal, to compile data corresponding to the depth of the bore at selected locations along the bore, and to display the compiled data so that the depth of the bore at the selected positions may be collectively identified.

Thus, for example, a receiver device may be a fixed device or a portable device carried by an operator to trace a new or existing bore. Similarly, the depth measurement device may measure bore depth in a variety of ways. For example, depth may be measured by determination of a field gradient of a received location signal or as a function of the pitch angle of a directional boring head. Furthermore, the measurement device may be an independent device or a device embodied by other system components, for example the receiver device.

Accordingly, all suitable apparatus and methods for accomplishing the present invention should be understood to be in the scope and spirit of the present invention. For ease of explanation, however, the remainder of the specification will address an exemplary preferred embodiment for use with a directional boring system as shown in FIG. 1. It should be understood that such an example is provided by way of illustration only and not in limitation of the invention. For example, the location signal may be radiated and received by any of the methods or systems described above.

Figure 2A:
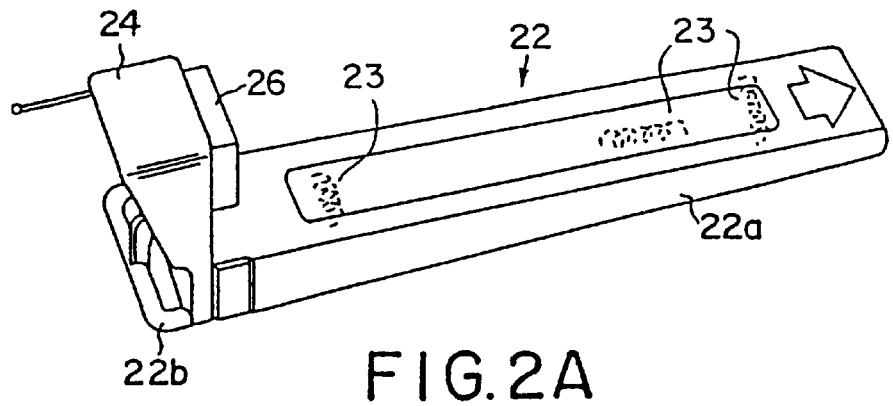
FIG. 2A is a perspective view of a receiver/transmitter in accordance with an embodiment of the present invention.
Figure 2B:
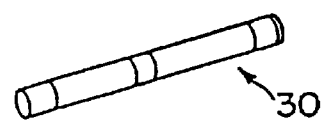
FIG. 2B is a perspective view of a signal generating probe.

Referring to FIGS. 2A and 2B, receiver 22 and signal generating probe 30 are illustrated. Receiver 22 includes a longitudinally extended plastic casing 22a which houses the receiving mechanism. Integrated with housing 22a is a display 24 and a handle 22b for positioning the receiver. Attached to the receiver is a wireless transmitter 26 whose operation will be described in more detail with respect to FIG. 5. Of course, transmitter 26 may be incorporated within the receiver unit. Housing 22a includes a plurality of horizontally spaced apart coils 23 (shown in Phantom in FIG. 2a) for receiving signals from the signal generating probe 30. Coils 23 form a crossed antenna configuration. Signal generating probe 30 generates a magnetic field that contains information with respect to the probe that is indicative of the boring head 16. The multiple coils 23 in housing 22a utilize the field gradient of the magnetic field from the signal generator to generate information as to the location and depth of the boring head. The particular mechanism for generating the signals representative of information concerning the boring head, and the particular mechanism of receiving this information as is done by receiver 22, does not form an essential part of the present invention in and of itself. One preferred method of measuring the signal generated by signal generating probe 30 is to measure the field gradient rather than the magnetic field strength in the manner as disclosed in U.S. Pat. No. 3,617,865 dated Nov. 2, 1971, the disclosure of which is incorporated herein by reference in its entirety.

In a preferred embodiment, the frequency of the signal output by the signal generator is approximately 38 KHz. Of course, any suitable frequency may be utilized, such as, for example, 1.2 KHz, 9.5 KHz, 114 KHz, etc.

Figure 4:
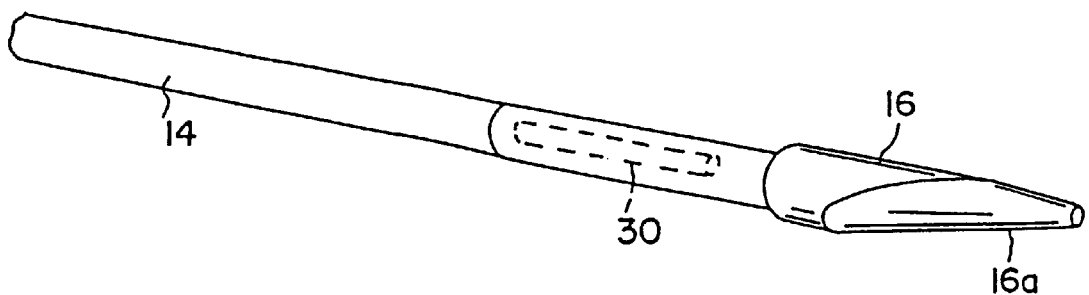
FIG. 4 is a perspective view of a directional boring head associated with a signal generating probe and drill rod.

Probe 30 in a preferred embodiment consists of a ferromagnetic core with copper windings on which an electrical current is placed to generate a magnetic field that is received by receiver 22 as set forth in U.S. Pat. No. 3,617,865. Probe 30 may be of varying types depending on the application desired, and may be capable of providing a variety of types of information. For example, location and depth of the probe (and, consequently, the boring head) may be measured by determining the field gradient of the magnetic field generated by probe 30. Mercury switches may be provided in a probe 30 around its inside perimeter so as to indicate the angular position or roll of the boring head. When the boring head is rotated to a particular position, the appropriate mercury switches will close and, therefore, angular position information is generated. As is indicated in FIG. 4, a directional boring head 16 has a sloped portion 16a for controlling the direction of the boring head in conjunction with the propulsion of the boring machine. With information as to the angular location of the sloped portion 16a, the boring head can be oriented to proceed in a desired direction. This is referred to herein as the roll of the directional boring head.

Figure 7:
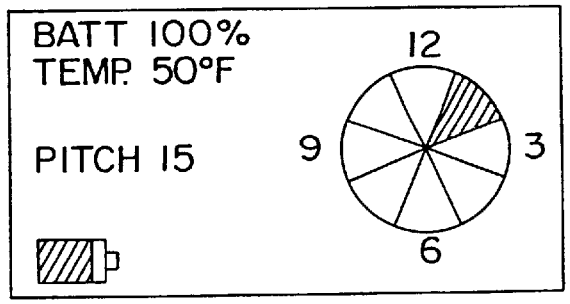
FIG. 7 is an exemplary visual display of a receiver and/or monitor device in accordance with an embodiment of the present invention.
Figure 8:
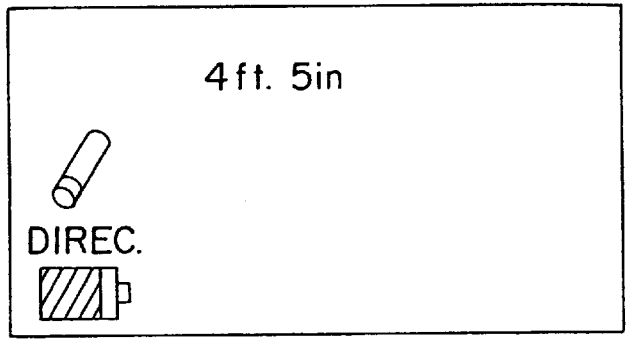
FIG. 8 is an exemplary visual display of a receiver and/or monitor device in accordance with an embodiment of the present invention.
Figure 9:
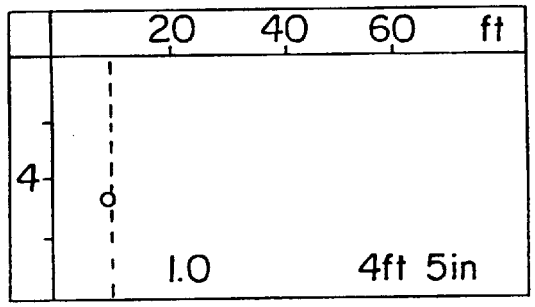
FIG. 9 is an exemplary visual display of a receiver and/or monitor device in accordance with an embodiment of the present invention.

In addition, probe 30 may contain a cradle-type switch for indicating the pitch above or below a horizontal plane or a plane parallel to the surface of the ground at which the directional boring head is located. Finally, indicators may be contained in the boring head and probe to indicate the battery life remaining in the probe or signal generator 30 as well as the temperature of the boring head. All of this information may be conveyed to the receiver through the magnetic field generated by the signal generator. Thus, for example, FIGS. 7, 8 and 9 illustrate possible visual displays of the receiver 22 and/or monitor 32. The display as in FIG. 7 illustrates the direction of the tapered surface 16a and pitch angle of boring head 16. The display in FIG. 8 illustrates the depth of the boring head at a particular instance.

It should be appreciated by one skilled in the art that, although receiving a magnetic field is one preferred embodiment, any suitable type system for determining the desired information about the boring head through a wireless radiated signal would be within the scope of the present invention. In addition, while the signal generator is referred to herein as a probe, it should be appreciated that other types of signal generators would also be within the scope of the present invention.

Figure 3:
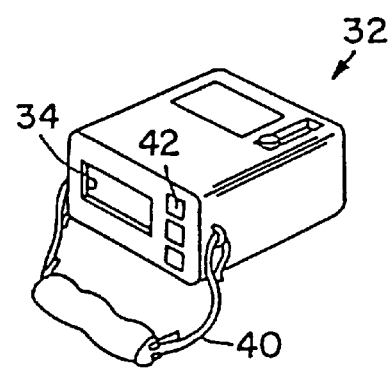
FIG. 3 is a perspective view of a remote receiver/display in accordance with an embodiment of the present invention.

Referring to FIG. 3, a more detailed view of remote monitor 32 as illustrated. Remote monitor 32 may be held around the neck of operator 36 by strap 40 or mounted to boring machine 12 in any suitable fashion. Monitor 32 contains a display 34 for displaying the information received from wireless transmitter 26. Display 34 is capable of displaying information identical to the information displayed on display 24 so that the operator 36 of the boring machine will have the same information as the operator 38 located at the boring head. In a preferred embodiment, display 34, as well as display 24, includes a clock face readout (FIG. 7) for indicating the angular position or roll of the boring head in quadrants, as well as indicators for the remaining information as discussed above. It should be understood that a graphic or visual display is one preferred form of display, but within the meaning of "display" or "indicate" as used herein, a voice or audio synthesizer could be substituted or other appropriate audible tones sufficient to convey the appropriate information to the operator. In addition, remote receiver 32 includes a touch pad control panel 42 for selecting the desired information to be displayed, adjusting the volume of the audible signal, or for other purposes as would be apparent to one skilled in the art. Display 24 has similar controls.

Referring to FIG. 4, directional boring head 16 includes a sloped or bent surface 16a for assisting in the directional propulsion of the boring head as described above. Boring head 16 is connected through boring rod 14 to boring machine 12. A component of the boring rod 14 contains a compartment into which the signal generating probe 30 may be inserted for generating the appropriate signals to convey the information with respect to the boring head as described above. As will be understood by those of ordinary skill in the art, as the boring head 16 advances through the bore, additional boring rods are added by operator 36. Thus, the progression of the boring head 16, and therefore the length of the bore, may be determined in terms of the number of boring rods expended.

Figure 5:
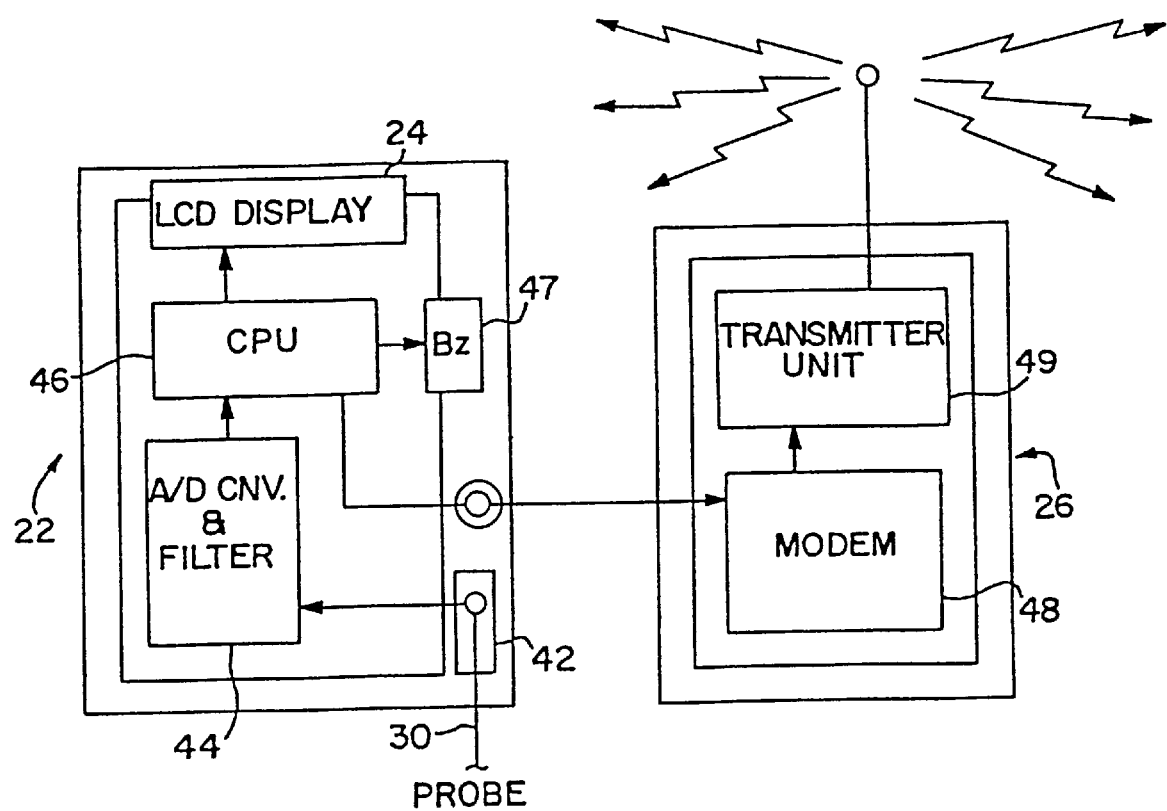
FIG. 5 is a block diagram illustrating the operation of a receiver/transmitter unit in accordance with an embodiment of the present invention.

Referring to FIG. 5, a block diagram is illustrated providing the operational characteristics of receiver 22 and wireless transmitter 26 to one skilled in the art. As illustrated, receiver 22 receives a signal generated by signal generating probe 30 via magnetic field as described above with respect to U.S. Pat. No. 3,617,865, or otherwise, and as would be readily apparent to one skilled in the art. The dual coil mechanism described above is illustrated at 42 in FIG. 5. The signal received by coil 42 is filtered and converted from an analog signal to a digital signal at 44. The digital signal is then processed in a central processing unit 46 to generate the appropriate audible signal as illustrated at speaker 47 and the appropriate visual signal through display 24. The conversion of the received signals from the probe to a visual display and audible output as illustrated in FIG. 5 is done in a conventional manner as would be apparent to one skilled in the art. An example of a known commercial product suitable for this function is the Micro Computerized Pipe Locator marketed by McLaughlin Manufacturing Co., Inc., 2006 Perimeter Road, Greenville, S.C. 29605, under the product number MPL-H5.

In accordance with the present invention, central processing unit 46 simultaneously and in real time conveys a signal representative of the information displayed on display 24 and sent to audible means 47 to wireless transmitter 26. Wireless transmitter 26 includes a frequency shift keyed modem 48 for receiving the signal from a central processing unit 46 and a transmitter chip 49 for transmitting the signal via wireless means to remote monitor 32. In a preferred embodiment, the digital signal is transmitted between receiver 22 and transmitter 26 at 1200 bits per second. Also, in a preferred embodiment, between modem 48 and transmitter 49, the "1" component of the digital signal is transmitted on a frequency of 1500 Hz and the "0" component of the digital signal is transmitted at approximately 2100 Hz. Of course, these are by way of example only.

Wireless transmitter 26 is capable of transmitting data and image signals and may be of any conventional type wireless transmitter with such capabilities. In a preferred embodiment, wireless transmitter 26 has selectable bands and transmits on a frequency of 469.50 MHz or 469.550 MHz with an output power of 18 milliwatts. Of course, these are by way of example also. In a preferred embodiment, the transmitter circuit corresponds to the Federal Communications Commission Standard no. ID-APV0290. The wireless transmitter is capable of transmitting both data and image signals and transmits the signals to the remote monitor 32 substantially simultaneously with the display on display 24, thereby providing real time information to the operator 36 of the boring machine 12.

Figure 6:
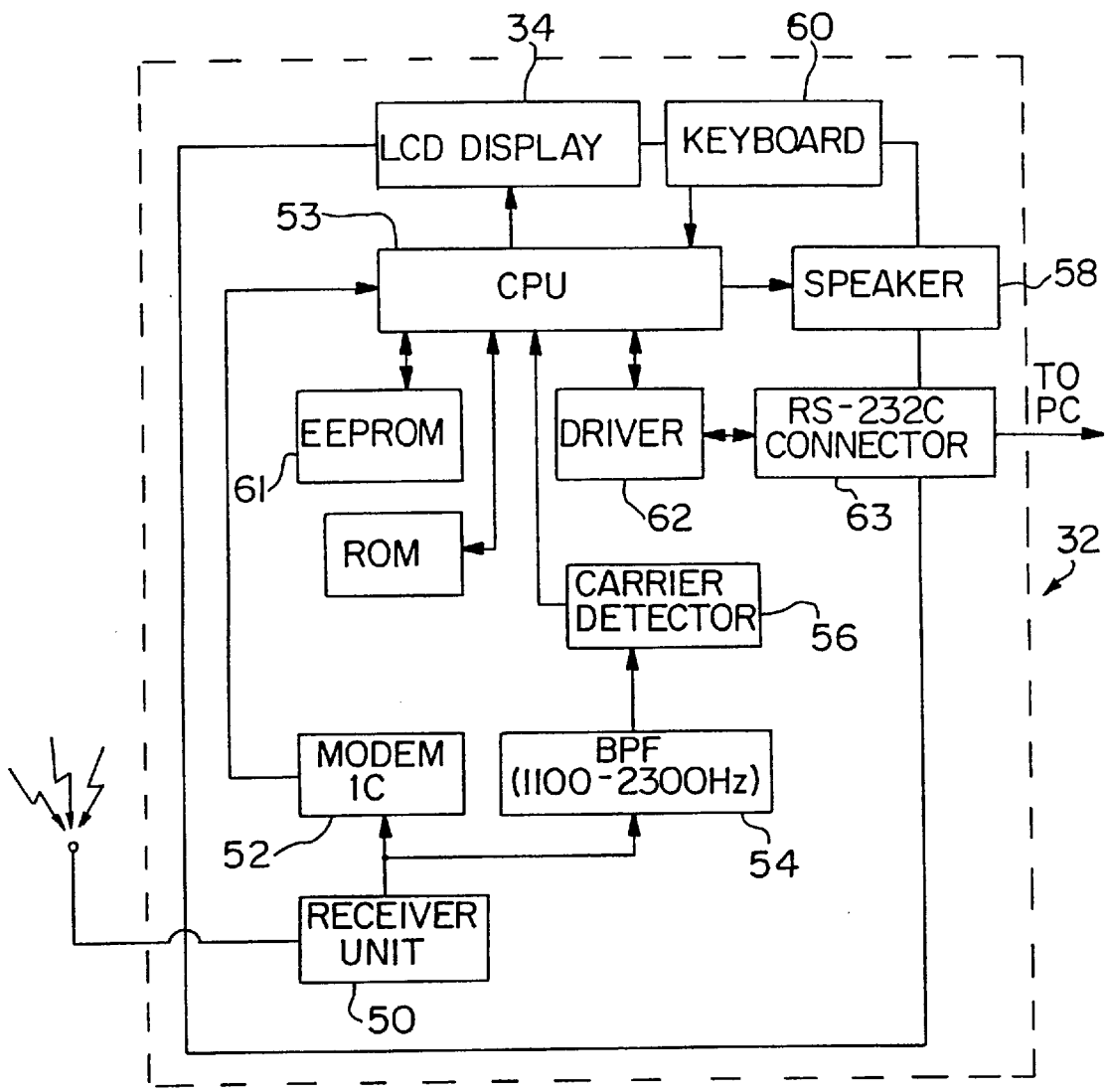
FIG. 6 is a block diagram illustrating the operation of a remote receiver unit in accordance with an embodiment of the present invention.

Referring to FIG. 6, the signal transmitted by wireless transmitter 26 is received by remote monitor 32 at receiver unit 50. Receiver unit 50 receives on the same frequency that transmitter 49 transmits on. In a preferred embodiment, such frequency is 469.50 MHz or 469.550 MHz. The circuitry utilized in remote monitor 32 also corresponds to FCC Standard ID-APV0290. The signal received at 50 is transmitted via frequency shift keyed modem 52 to central processing unit 53. In a preferred embodiment, this is an eight-bit signal and represents the display and audio components of the signal transmitted to monitor 32. A band pass filter 54 and carrier detector 56 may be utilized to filter and enhance the signal provided to the central processing unit 53. The filter 54 may filter signals, for example, outside of a range of 1100 to 2300 Hz. In this embodiment, carrier detector 56 provides a one-bit signal to central processing unit 53 as to whether a radio wave is sending or not, and this controls the receipt by the central processing unit 53. The signal between receiver unit 50 and band pass filter 54 is conveyed as described above with respect to the signal between modem 48 and transmitter 49 with respect to the frequencies. The central processing unit 53 processes the signal to produce an image on display 34 as well as an audible component if desired via speaker 58. It should be appreciated that both transmitter 26 and monitor 32 may be of conventional design for the wireless transmission of data and the image signals, the particulars of which are not essential to the present invention.

As discussed above, receiver 22 is also a measurement device capable of measuring the depth of the probe below the ground surface. This information is transmitted to, and received by, monitor 32 as discussed above. Thus, referring to FIG. 9, display 34 indicates the depth of the boring head 16 at a particular selected location. In this embodiment, a depth of 4 feet 5 inches is indicated at a distance of 1 rod length, where 1 rod is equal to 10 feet. Operator 36 may record this information by depressing an appropriate key on keyboard 60, causing CPU 53 to store the depth data associated with the appropriate rod length in EEPROM 61. As each additional rod is expended, operator 36 may cause CPU 53 to record the depth data received by receiver 22. CPU 53 has been preprogrammed by operator 36 via keyboard 60 prior to the boring operation to receive depth data in intervals of expended rods where each rod length is equal to 10 feet. Accordingly, when operator 36 depresses a "SET" key on keyboard 60, the current depth measurement at CPU 53 is automatically stored in EEPROM 61 and associated with the current cumulative rod number.

Figure 10:
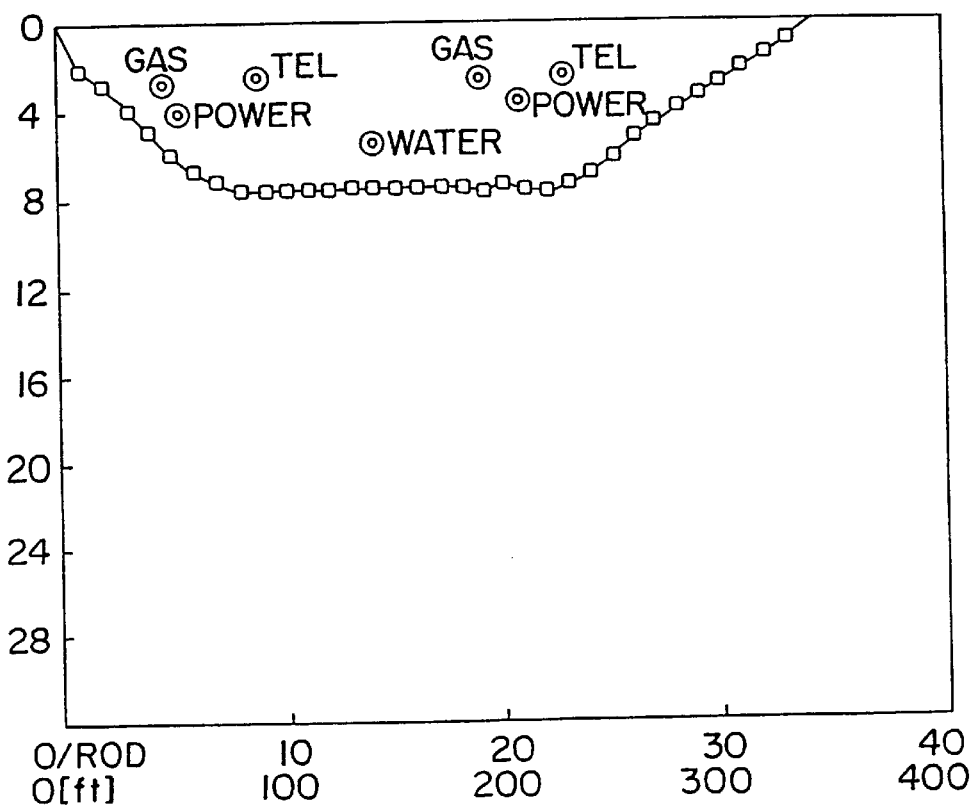
FIG. 10 is an exemplary bore plot generated in accordance with an embodiment of the present invention.

Thus, as rods are expended and depth data is recorded, depth data associated with selected locations along the bore is compiled. Accordingly, a bore map may be generated at display 34 or, for example, at a personal computer included with monitor 32, as illustrated in FIG. 10. The vertical axis of the plot of FIG. 10 indicates feet below ground surface. The horizontal axis provides the length of the bore in the number of rods and rod feet. Thus, at the first extended rod, the bore illustrated was 2 feet deep while at the 10th rod the bore was nearly 8 feet. Of course, the cumulative data may be presented in a variety of fashions, for example in tabular form. Accordingly, any and all suitable methods of identifying the compiled data should be understood to be within the scope of the present invention.

A system including the above described mapping capabilities is the MOLE MAP™, marketed by McLaughlin Manufacturing Company, Inc., 2006 Perimeter Road, Greenville, S.C. 29605. This system includes the capability to change the units at which depth measurements are taken. For example, in programming CPU 53, keys on keyboard 60 may be used to adjust the length of the rods in a boring system. Thus, by adjusting the rod length utilized by CPU 53, an operator may configure the system to record depth measurements at a partial rod length or at multiple rods. As the predetermined number of rods are expended, the operator would then press the "set" key on keyboard 60 to record the depth data at that point. Of course, those of ordinary skill in the art should understand that it is possible to create a control system that would automatically record the depth data received from receiver 22 as the rods are expended. As noted above, a map may be generated as in FIG. 10 at display 34 or at a PC included with monitor 32 as indicated in FIG. 6. The plot data is provided to the PC via driver 62 and RS-232C connector 63 as indicated. Alternatively, monitor 32 may be embodied by a PC device. The information may be provided to the PC in real time as the depth data is recorded by operator 36 via keyboard 60. Furthermore, a cumulative plot stored in EEPROM 61 may be downloaded to a PC and printer via connector 63. It should be understood, however, that monitor 32 may or may not include a PC.

As discussed above, the present system may be used to map existing utilities. In such a configuration, CPU 53 would be programmed to receive depth data in intervals of actual ground distance. Thus, an operator 38 as in FIG. 1 would trace the existing utility with receiver 22. As the operator moves away from a starting point, the operator 36 would record depth data on a monitor at predetermined intervals from the starting point. Thus, a map of an existing utility similar to the map shown in FIG. 10 may be generated. However, the horizontal axis would be structured in terms of actual distance rather than rod lengths. Monitor 32, via CPU 53 or a personal computer, may be configured to merge existing utility plots with a boring system plot. Of course, the horizontal axis of either the boring system plot or the utility plot must be converted so that the maps are compatible.

Referring again to FIG. 10, existing utilities running perpendicular to the new bore are indicated. Such utilities are known utility positions which the new bore must avoid. Accordingly, the ability of operator 36 (FIG. 1) to view a bore plot as the bore is being made enables the operator to control the directional boring head by controls 20 to avoid such existing utilities.

Figure 13A:
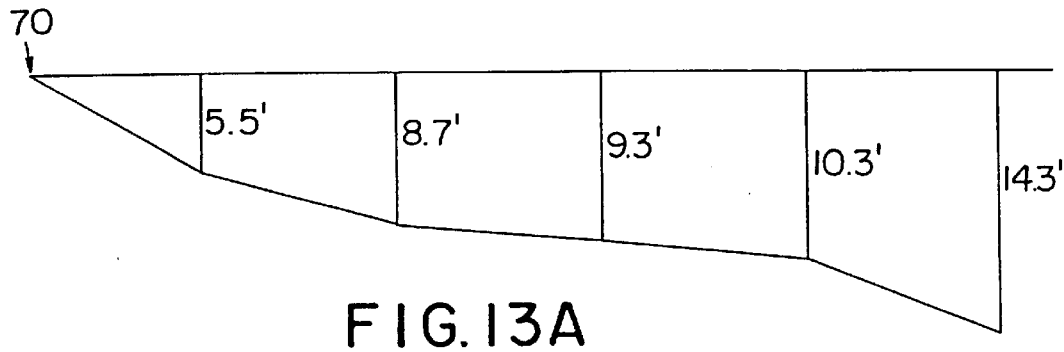
FIG. 13A is a partial graphical representation of a depth measurement procedure practiced in accordance with a preferred embodiment of the present invention.
Figure 13B:
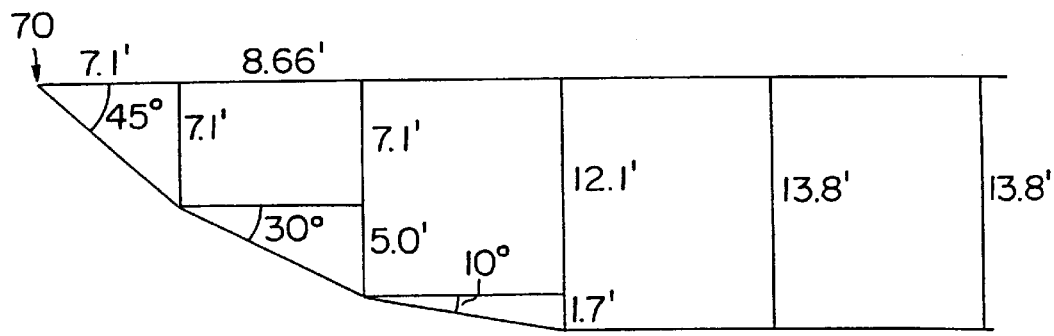
FIG. 13B is a partial graphical representation of a depth measurement procedure practiced in accordance with a preferred embodiment of the present invention.

As noted above, stationary receiver devices may be used in preferred embodiments of the present invention to generate a boring system plot. One method of measuring bore depth with respect to the ground surface in such a system utilizes the pitch angle of the directional boring head. Referring to FIG. 13B, a bore is graphically illustrated beginning at ground level at 70. The first ten foot rod section is expended at a 45° angle, and, thus, the depth of the bore at the first rod is 7.1 feet as shown. The pitch angle at the directional boring head may change as new rods are expended. In FIG. 13B, the pitch angles at the second, third, fourth, and fifth rods were 30°, 10°, 0°, and 0°, respectively. The depths at these points are 12.1 feet, 13.8 feet, 13.8 feet, and 13.8 feet, respectively.

This depth information may be transmitted from a stationary receiver device to a monitor device for use in generating a bore plot as described above. Again, the horizontal axis may be presented either in terms of expended rods (FIG. 10) or in actual ground distance. For example, if a plot were generated from the depth information of FIG. 13B, a depth of 7.1 feet would be marked at 1 rod (or 10 feet if a rod is 10 feet long) while a depth of 12.1 would be marked at 2 rods. If the plot is presented in terms of ground distance, a depth of 7.1 feet would be marked at 7.1 feet from starting point 70 while a depth of 12.1 feet would be marked at 15.76 feet from point 70.

Figure 13C:
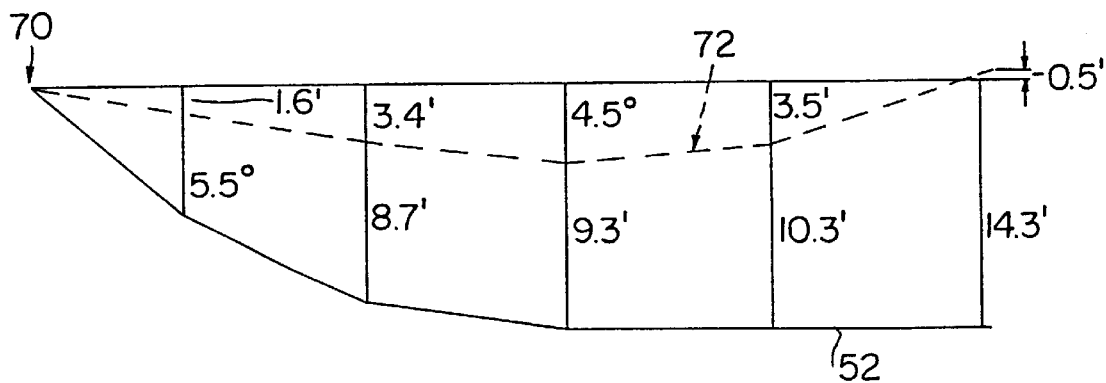
FIG. 13C is a partial graphical representation of a depth measurement procedure practiced in accordance with a preferred embodiment of the present invention.

An accurate plot may be generated from the information as in FIG. 13B if the ground surface is substantially level. If the bore is made below a ground surface that is not level, the depth information of FIG. 13B must be modified if an accurate plot is to be obtained. For example, FIG. 13A graphically represents exemplary depth measurements made at each of the rod positions along the bore represented in FIG. 13B by, for example, a portable measurement device as described above. The depth data from FIG. 13B may then be modified to determine the position of the bore 52 with respect to an actual ground surface elevation line 72 as illustrated in FIG. 13C. The adjustment may be made by a central processing unit such as CPU 53 as in FIG. 6.

It should also be understood by those of ordinary skill in the art that receiver 22 may also be configured to compile the data associated with the selected locations as described above with respect to monitor 32. That is, monitor 32 may be at least partially embodied by a receiver 22. This may be particularly advantageous in systems where only a utility plot is desired. In such case, a transmitting source radiates the location signal from the bore as described above, while a single portable unit may be used to receive the location signal, measure the depth, and compile the depth data associated with the selected location. Thus, a single apparatus would encompass the receiver device, measurement device and monitor device. Of course, in a directional boring system as shown in FIG. 1, receiver device 22 may be configured to simultaneously provide the same display as presented to the operator 36 at monitor 32.

These and other modifications and variations of the present invention may be practiced by those of ordinary skill in the art without departing from the spirit and scope of the present invention, which is more particularly set forth in the appended claims. Furthermore, those of ordinary skill in the art will appreciate that the foregoing description is by way of example only, and is not intended to limit the invention so further described in such appended claims, and that the aspects of varying embodiments may be interchanged in whole or in part.

What is claimed:

1. A system for mapping horizontal bores below a ground surface, said system comprising:
    a transmitting source configured to output a location signal from the bore; and
    a receiver assembly in operative communication with said transmitting source and configured to receive said location signal, to determine, responsively to said location signal, the depth of the bore with respect to a ground surface, to compile depth data corresponding to the depth of the bore with respect to said ground surface along a horizontal length thereof, and to output the compiled data.

2. The system as in claim 1, wherein said transmitting source is configured to radiate a location signal from the horizontal bore.

3. The system as in claim 1, wherein said receiver assembly is configured to determine the lateral position of the horizontal bore responsively to a location signal output by said transmitting source.

4. The system as in claim 1, wherein said receiver assembly includes
    a receiver device configured to receive a location signal from said transmitting source and to indicate, responsively thereto, the lateral position of the horizontal bore,
    a measurement device configured to measure the depth of the bore with respect to said reference surface, and
    a monitor device configured to receive depth data from said measurement device, to compile the depth data, and to output the compiled depth data.

5. A system for mapping horizontal bores below a ground surface, said system comprising:
    a transmitting source configured to output a location signal from the bore;
    a receiver device configured to receive the location signal, said receiver device including a portable assembly adapted to be carried by an operator approximately above the bore;
    a measurement device configured to measure the depth of the bore with respect to a reference surface; and
    a monitor device configured to compile data corresponding to the depth of the bore measured by said measurement device along a horizontal length of the bore, and to output the compiled data.

6. The system as in claim 5, wherein said transmitting source is configured to radiate a location signal from the horizontal bore and wherein said receiver device is configured to receive the radiated location signal and determine the lateral position of the bore with respect to said receiver device responsively thereto.

7. The system as in claim 5, including a boring machine having a boring rod including a directional boring head, said boring machine further including manipulative controls actuatable by an operator to guide said boring head.

8. The system as in claim 7, wherein said transmitting source includes a signal generating probe associated with said boring head for generating the location signal.

9. The system as in claim 5, wherein said monitor device includes a personal computer.

10. A system for mapping horizontal bores below a ground surface, said system comprising:
    means for transmitting a location signal from the bore;
    means for receiving the location signal;
    means for measuring the depth of the bore with respect to a reference surface;
    means for compiling the depth data corresponding to the depth of the bore along a horizontal length thereof; and
    means for outputting the compiled depth data.

11. A system for mapping horizontal bores below a ground surface, said system comprising:
    a transmitting source configured to radiate a location signal from the bore;
    a portable receiver and measurement device adapted to be carried by an operator during operation at a location approximately above the bore to receive the location signal, said receiver and measurement device being configured to determine, responsively to the location signal, the depth of the horizontal bore with respect to the ground surface;
    said receiver and measurement device including a transmitter for wirelessly transmitting from the receiver and measurement device an informational signal corresponding at least to the depth of the bore; and
    a monitor device configured to compile data corresponding to the depth of the bore measured by said measurement device along a horizontal length of the bore, and to output the compiled data.

12. The system as in claim 11, wherein said monitor device includes a personal computer device and is configured to generate a plot of bore depth along the horizontal length of the bore.

13. A method for mapping horizontal bores below a ground surface, said method comprising the steps of:
    radiating a location signal from the bore;
    receiving the location signal;
    determining the depth of the bore with respect to a ground surface responsively to the received location signal;
    electronically compiling data corresponding to the depth, determined at said determining step, of the bore along a horizontal length of the bore; and
    outputting a signal corresponding to the compiled data.

14. The method as in claim 13, wherein said outputting step includes outputting said signal as a visual display.

15. A system for mapping horizontal bores below a ground surface, said system comprising:
    a boring machine driving a boring rod including a directional boring head, said boring machine including manipulative controls actuatable by an operator to guide said boring head;
    a signal generating probe attached at said boring head and configured to generate a location signal from the bore;
    a portable receiver and measurement device adapted to be carried by an operator during operation at a location approximately above the bore to receive the location signal, said receiver and measurement device being configured to receive said location signal and to measure, responsively to said location signal, the depth of said probe with respect to the ground surface;

said receiver and measurement device including a transmitter for wirelessly transmitting from the receiver and measurement device an informational signal corresponding at least to said probe depth; and a monitor device including
 a receiver circuit configured to receive said informational signal,
 a memory circuit, and
 a control device configured to store, responsively to an instruction signal received from an operator, probe depth data from said informational signal in said memory circuit so that said depth data is identified with a position along said horizontal bore at which said probe depth is measured.

16. The system as in claim 15, wherein said memory circuit and said control device are disposed with said receiver circuit in an integrally constructed said monitor device.

17. The system as in claim 15, wherein said monitor device includes a display device configured to graphically display, responsively to said control device, said depth data at a plurality of said positions.

18. A system for mapping horizontal bores below a ground surface, said system comprising:
 means for radiating a location signal from the bore;
 means for receiving the location signal and for indicating, responsively to the location signal, the lateral position of the horizontal bore with respect to said receiving means;
 means for measuring the depth of the bore with respect to the ground surface at selected location along said bore; and
 means for receiving depth data from said measuring means, compiling the depth data associated with the selected locations with respect to at least one reference position, and outputting the compiled depth data so that the depth of the bore at the selected locations may be collectively identified.

19. A system for mapping horizontal bores below a ground surface of an area in which at least one existing underground bore is located, said system comprising:
 a transmitting source configured to output a location signal from the horizontal bore; and
 a receiver assembly in operative communication with said transmitting source and configured to store data corresponding to the depth of an existing underground bore with respect to the ground surface, to receive the location signal, to determine responsively to the location signal the depth of the horizontal bore with respect to the ground surface and to generate a plot of the existing underground bore, and the bore depth along a length of the horizontal bore, with respect to the ground surface.

20. The system as in claim 19, wherein the receiver assembly is configured to plot the existing underground bore only where the existing underground bore crosses any vertical line defined by the horizontal bore length.

21. The system as in claim 19, wherein said receiver assembly includes
 a receiver device configured to receive a location signal from said transmitting source and to indicate, responsively thereto, the lateral position of the horizontal bore,
 a measurement device configured to measure the depth of the horizontal bore with respect to the ground surface, and
 a monitor device configured to receive depth data from the measurement device and to generate said plot.

22. A system for mapping horizontal bores below a ground surface of an area in which at least one existing underground bore is located, said system comprising:
 a transmitting source configured to radiate a location signal from the horizontal bore;
 a portable receiver and measurement device adapted to be carried by an operator during operation at a location above the horizontal bore to receive the location signal, the receiver and measurement device being configured to determine, responsively to the location signal, the depth of the horizontal bore with respect to the ground surface;
 the receiver and measurement device including a transmitter for wirelessly transmitting from the receiver and measurement device an informational signal corresponding at least to the depth of the horizontal bore; and
 a monitor device configured to receive the informational signal, to store data corresponding to the depth of an existing underground bore with respect to the ground surface, and to generate a plot of the existing underground bore, and the bore depth along a length of the horizontal bore, with respect to the ground surface.

23. The system as in claim 22, wherein said monitor device includes a personal computer device.

24. The system as in claim 22, wherein the monitor device is configured to plot the existing underground bore only where the existing underground bore crosses any vertical line defined by the horizontal bore length.

25. A system for mapping horizontal bores below a ground surface, said system comprising:
 a transmitting source configured to output a location signal from a horizontal bore; and
 a receiver assembly in operative communication with said transmitting source and configured to receive the location signal, to determine, responsively to the location signal, the depth of the horizontal bore with respect to the ground surface, and to generate a plot of the ground surface elevation and the horizontal bore's depth along a length of the horizontal bore with respect to the ground surface elevation.

26. The system as in claim 25, wherein the receiver assembly includes
 a receiver device configured to receive a location signal from the transmitting source and to indicate, responsively thereto, the lateral position of the horizontal bore,
 a measurement device configured to measure the depth of the horizontal bore with respect to the ground surface, and
 a monitor device configured to receive depth data from the measurement device and to generate said plot.

27. A system for mapping horizontal bores below a ground surface, said system comprising:
 a transmitting source configured to radiate a location signal from the horizontal bore;
 a portable receiver and measurement device adapted to be carried by an operator during operation at a location above the horizontal bore to receive the location signal, the receiver and measurement device being configured to determine, responsively to the location signal, the depth of the horizontal bore with respect to the ground surface;

the receiver and measurement device including a transmitter for wirelessly transmitting from the receiver and measurement device an informational signal corresponding at least to the depth of the horizontal bore; and a monitor device configured to receive the informational signal and to generate a plot of the ground surface elevation and the bore depth along a length of the horizontal bore with respect to the ground surface elevation.

28. The system as in claim 27, wherein said monitor device includes a personal computer device.

29. A boring system for use in an area in which at least one existing underground bore is located, said system comprising:

a boring machine having a boring head and manipulative controls actuatable by an operator to guide the boring head in a horizontal bore;

a transmitting source associated with the boring head and configured to generate a location signal from the horizontal bore;

a signal mechanism in communication with an existing underground bore and configured to generate an electromagnetic signal along the existing underground bore; and a receiver assembly configured to receive the electromagnetic signal and the location signal and to determine the relative position of the existing underground bore and the horizontal bore responsively thereto.

30. The system as in claim 29, wherein the electromagnetic signal includes a magnetic field radiated from the existing underground bore.

31. The system as in claim 29, wherein the existing underground bore includes a metallic utility line.

32. The system as in claim 29, wherein the receiver assembly includes a receiver device configured to receive a location signal from said transmitting source and to indicate, responsively thereto, the lateral position of the horizontal bore, a measurement device configured to measure the depth of the horizontal bore with respect to the ground surface, and a monitor device configured to receive depth data from the measurement device.

33. The system as in claim 32, wherein the receiver device and the measurement device comprise a portable assembly adapted to be carried by an operator approximately above the bore.

34. The system as in claim 33, wherein the portable assembly includes a transmitter for wirelessly transmitting the depth data to the monitor device.

35. A system for mapping horizontal bores below a ground surface of an area in which at least one existing underground bore is located, said system comprising:

a boring machine driving a boring rod including a directional boring head, said boring machine including manipulative controls actuatable by an operator to guide said boring head;

a signal generating probe attached at said boring head and configured to radiate a location signal from the bore;

a portable receiver and measurement device adapted to be carried by an operator during operation at a location approximately above the bore to receive the location signal, said receiver and measurement device being configured to receive said location signal and to measure, responsively to said location signal, the depth of said probe with respect to a reference surface;

said receiver and measurement device including a transmitter for wirelessly transmitting from the receiver and measurement device an informational signal corresponding at least to said probe depth; and a monitor device including
  a receiver circuit configured to receive said informational signal,
  a memory circuit, and
  a control device configured to store, responsively to an instruction signal received from an operator, probe depth data from said informational signal in said memory circuit so that said depth data is identified with a position along said horizontal bore at which said probe depth is measured, wherein said monitor device is configured to store data corresponding to the depth of an existing underground bore with respect to said reference surface, and wherein said control device is configured to generate a plot of said existing underground bore, and the depth of said horizontal bore along a length of said horizontal bore, with respect to said reference surface.

36. The system as in claim 35, wherein said reference surface is a ground surface.

* * * * *